3,583,028
HEATED EXTRUDER
Vladimir Alexeevich Bely, Rogachevskaya ul. 332, kv. 5;
 Evgeny Mikhailovich Vvedensky, Ul. Paulova 7, kv. 35;
 Vitaly Alexeevich Ivolgin, Barykina 125, kv. 13; and
 Jury Mikhailovich Pleskachevsky, Proezd Levanevskogo
 44, all of Gomel, U.S.S.R.
Filed Aug. 16, 1968, Ser. No. 753,095
Int. Cl. B29f 3/08
U.S. Cl. 18—12                              8 Claims

ABSTRACT OF THE DISCLOSURE

An extruder having a hollow body and a worm supported therein is connected in an electric circuit so that the worm and the hollow body annularly spaced therefrom constitute heating elements for heating a thermoplastic material. As an alternative embodiment, the hollow body can be surrounded by a housing annularly spaced therefrom, the hollow body and the housing then constituting the heating elements, the innermost heating element in each embodiment being heated to a higher temperature than that of the outermost heating element due to the annular proximity therebetween.

---

The present invention relates to extruders used in chemical industry for granulating, plasticizing and mixing thermoplastics; in machine building, shipbuilding, construction and electrical engineering industries when processing thermoplastics into prefabricated articles (for instance, pipes and protective films in construction, insulators and electrical panels in electrical engineering, inserts and flanges in machine manufacturing and shipbuilding).

Known in the art are designs of extruders in which the mass being processed is melted, compressed and pressed out of the body by a worm. Heating elements designed to melt this mass are integral components of such extruders.

There are different systems composed of heating elements. For instance, there are heating elements with ohmic resistance means, mounted on the outer surface of the extruder body. These heaters are not economical due to great losses of heat into the atmosphere and for heating the body.

The liquid heating by means of a heating jacket surrounding the body, which is used in extruders, is bulky in design and complicated in operation.

Non-uniform heating of the mass being processed and the overheating in external layers is a disadvantage typical of the known extruders. Moreover, they are not safe in operation due to a high voltage present in the case of electric ohmic heating and because of the adapting connection members provided in supply mains with superheated steam and liquid in the case of jacket heating.

It is an object of the present invention to provide an extruder insuring uniform heating of the mass being processed, and one that is simple in design, reliable in use and more economical.

This object may be accomplished by providing an extruder for processing thermoplastic materials, according to the invention, whose body is electrically connected in series with an element arranged coaxially with the body, and constitutes, together with this element, a pair heated by current on the principle of the effect of proximity of coaxial conductors and serve to heat and melt the material being processed.

In the extruder of the invention, serving as an element coaxial with the body and constituting together with the latter a pair heated by the current on the principle of the effect of proximity of coaxial conductors, may be a casing put on the body with a clearance between them and having electrical contact with the body at the outlet butt of the latter.

Along wih this, in the extruder of the invention, serving as an element coaxial with the body and making up together with the latter a pair heated by current on the principle of the effect of proximity of coaxial conductors may be a worm having electrical contact with the body on the side of its outlet, for instance, within the throttling grid area.

Furthermore, in the extruder of the invention, the clearance between the body and the element coaxial with it may be made variable, decreasing from the loading area to the outlet.

It is feasible in the extruder of the invention to provide for the pitch of the worm crests to decrease toward the outlet, with their width increasing correspondingly.

The invention will be more apparent upon examining the appended drawings of an embodiment thereof, wherein.

Figure 1:
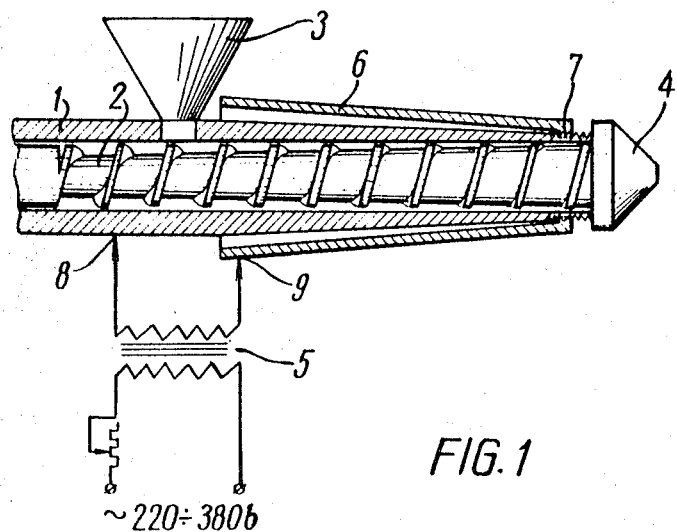
FIG. 1 shows the longitudinal section of an extruder of the invention.

The extruder shown in the drawings comprises a body 1 (FIGS. 1 and 2), a worm 2, a loading bin 3, a die 4 and a step-down transformer 5. The extruder, according to the first version, has a casing 6.

The extruder indicated in the drawings operates in the following way: a thermoplastic material in the form of small particles of any granulometric composition is charged through the bin 3 into the body 1, wherein the mass being processed is melted.

In the extruder shown in FIG. 1, the melting is in progress when the material being processed contacts the inner surface of the heated body 1. In the extruder shown in FIG. 2, the melting takes place when the material being processed contacts the outer surface of the heated worm 2 and the inner surface of the heated body 1.

The melted mass is mixed, compressed and conveyed by means of the worm 2 to the outlet of the die 4.

Serving as the heating elements for the extruder shown in FIG. 1 are the extruder body 1 and the casing 6 annularly spaced from the body 1, both being interconnected at the outlet butts by means of, for example, a threaded joint 7, and connected in series in an electric circuit.

Figure 2:
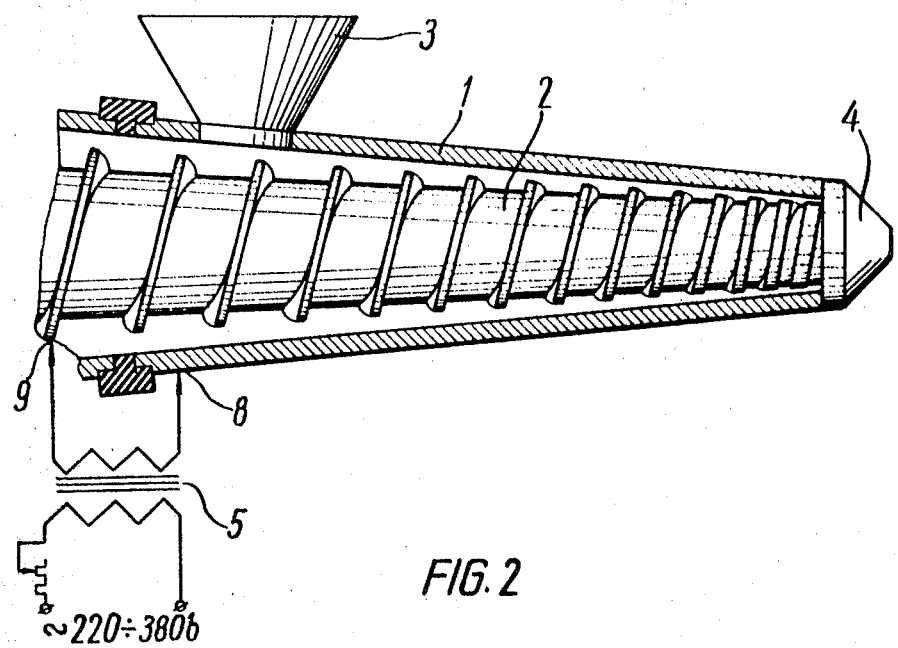
FIG. 2 shows the longitudinal section of an extruder, according to another embodiment of the invention.

Serving as the heating elements for the extruder shown in FIG. 2 are the body 1 and the worm 2 interconnected by a sliding contact, for example, through a throttling grid, and connected in series in an electric circuit.

Current from the power step-down transformer 5 goes, via contacts 8 and 9, to an electric circuit made up of the series-connected conductors: the body 1 and the casing 6 (FIG. 1), in one instane, and the casing 1 and the worm 2 (FIG. 2), in the other.

The coaxial positioning of the conductors and a small clearance between them provide for the interaction of the electromagnetic fields of these conductors and, as a result, makes possible the manifestation of the proximity effect. Said conductors thereby function as heating elements.

In the extruder, according to the first version, the body 1 and the casing 6 serve as heating elements; the body 1, having direct contact with the mass being processed and being the inner one of the two coaxial conductors with the above-indicated electrical connection, is heated more quickly and provides for several times more heat than the outer casing 6. The threaded contact 7 permits clearance variation between the body 1 and the casing 6 and, consequently, the temperature of heating the body and the mass being processed throughout the respective extruder areas can be regulated.

In the extruder, according to the second version, the body 1 and the worm 2 serve as heating elements; the worm, being the inner one of the two coaxial conductors with the above-indicated electrical connection, is heated more quickly and provides for more heat than the outer body. The decrease of the pitch of the worm crests from the loading area to the outlet along with an increase in their width provides for heating the mass being processed throughout respective areas of the extruder.

The designs of extruders described hereinabove are reliable and safe in operation, economical and have prolonged service life.

Owing to the simplicity of their design, the extruders of the present invention may be easily adapted for the heating system with a pair heated by current on the principle of the effect of proximity of coaxial conductors.

Furthermore, the extruders according to the first and second versions insure the optimal conditions for heating the material being processed throughout respective areas of the extruder; as a result, the technological process functions smoothly and the quality of prefabricated products is improved.

Here are some of the characteristics of an extruder according to the second version (the body and worm as heating elements), as compared with domestic and foreign-made models.

| 1 | 2 | 3 | 4 |
|---|---|---|---|
| Parameters | Extruder with coaxial heating (body-worm), worm diameter 20 mm. | Domestic extruder, worm diameter 32 mm. | "Batenfeld" extruder (FRG), worm diameter 20 mm. |
| 1. Specific surface power of electric heaters, w./cm.² | 0.4-0.5 | 7 | Up to 5. |
| 2. Aggregate power of heaters, kw. | 0.2-0.3 | 4.2 | 3 |
| 3. Heater supply voltage, v. | 1.5-2.5 | 220/380 | 220/380 |
| 4. Current strength in heaters, a. | 150-200 | 12-20 | |

We claim:
1. Apparatus for extruding thermoplastic material, said apparatus comprising an elongate hollow body for receiving said thermoplastic material wherein said thermoplastic material is extruded and wherefrom said thermoplastic material is expelled, said elongate hollow body constituting a first heating means, elongate means annularly spaced from and concentrically supported relative to said hollow body for constituting a second heating means, one of said heating means constituting an innermost heating means and the other an outermost heating means, and circuit means electrically connecting said first heating means with said second heating means such that due to the annular proximity of said first and second heating means with one another the innermost heating means is heated to a higher temperature than that of the outermost heating means, whereby said thermoplastic material is heated as it is extruded.

2. Apparatus as claimed in claim 1 wherein said second heating means includes a hollow housing surrounding said hollow body, said hollow housing constituting said outermost heating means, said hollow body including a worm rotatably supported therein for extruding and expelling said thermoplastic material from said hollow body.

3. Apparatus as claimed in claim 2 wherein said hollow body includes an inlet portion and an outlet portion, said worm being annularly spaced from said hollow body, the annular spacing between said hollow body and said worm decreasing from said inlet portion to said outlet portion.

4. Apparatus as claimed in claim 2 wherein said hollow body includes an outlet portion, said housing being electrically connected to said hollow body at said outlet portion.

5. Apparatus as claimed in claim 4 wherein said hollow body includes an inlet portion and an outlet portion, said worm being annularly spaced from said hollow body, the annular spacing between said hollow body and said worm decreasing from said inlet portion to said outlet portion.

6. Apparatus as claimed in claim 1 wherein said second heating means includes a worm rotatably supported in said hollow body, said worm constituting said innermost heating means.

7. Apparatus as claimed in claim 6 wherein said hollow body includes an inlet portion and an outlet portion, said worm being annularly spaced from said hollow body, the annular spacing between said hollow body and said worm decreasing from said inlet portion to said outlet portion.

8. Apparatus as claimed in claim 6 wherein said hollow body includes an inlet portion and an outlet portion, and said worm includes worm crests, said worm crests having a pitch decreasing in a longitudinal direction toward said outlet portion, and a width increasing in the longitudinal direction toward said outlet portion.

References Cited

UNITED STATES PATENTS

| 2,343,529 | 3/1944 | Brown | 18—12SF |
| 2,830,104 | 4/1958 | Steekhardt et al. | 18—12SF |
| 2,893,055 | 7/1959 | Wenzel | 18—18SJ |
| 3,055,053 | 9/1962 | Livingston et al. | 18—12SJ |
| 3,129,459 | 4/1964 | Kullgren et al. | 18—12SJ |
| 3,335,460 | 4/1967 | Radl | 18—12DM |

F. T. YOST, Primary Examiner